(12) United States Patent
Huang

(10) Patent No.: US 12,169,262 B2
(45) Date of Patent: Dec. 17, 2024

(54) DATA ANALYSIS APPARATUS, DATA ANALYSIS METHOD, AND COMPUTER-READABLE RECORDING MEDIUM

(71) Applicant: NEC Corporation, Tokyo (JP)

(72) Inventor: Chenhui Huang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 434 days.

(21) Appl. No.: 17/617,993

(22) PCT Filed: Jun. 21, 2019

(86) PCT No.: PCT/JP2019/024831
§ 371 (c)(1),
(2) Date: Dec. 10, 2021

(87) PCT Pub. No.: WO2020/255413
PCT Pub. Date: Dec. 24, 2020

(65) Prior Publication Data
US 2022/0308260 A1  Sep. 29, 2022

(51) Int. Cl.
*G01V 20/00* (2024.01)
*G06N 20/00* (2019.01)

(52) U.S. Cl.
CPC .............. *G01V 20/00* (2024.01); *G06N 20/00* (2019.01)

(58) Field of Classification Search
None
See application file for complete search history.

(56) References Cited

U.S. PATENT DOCUMENTS

2013/0185236 A1   7/2013   Tonouchi et al.

FOREIGN PATENT DOCUMENTS

| JP | 2000-002769 A | 1/2000 |
|----|---------------|--------|
| JP | 2004-089032 A | 3/2004 |
| JP | 2012-037427 A | 2/2012 |
| WO | 2012/086443 A1 | 6/2012 |
| WO | 2018/216623 A1 | 11/2018 |

OTHER PUBLICATIONS

International Search Report for PCT Application No. PCT/JP2019/024831, mailed on Sep. 3, 2019.
English translation of Written opinion for PCT Application No. PCT/JP2019/024831, mailed on Sep. 3, 2019.

*Primary Examiner* — Walter L Lindsay, Jr.
*Assistant Examiner* — Geoffrey T Evans
(74) *Attorney, Agent, or Firm* — Sughrue Mion, PLLC

(57) ABSTRACT

A data analysis apparatus 10 includes; an align unit 11 that acquires a pair data of a first data indicating a characteristic of a specific region and a second data corresponding to the first data and indicating another characteristic of the specific region, and aligns the first data in order of their sizes, a classification model generation unit that groups the pair data based on a characteristic of an order distribution of the first data after alignment, classifies the pair data, and generates a classification model for classifying the pair data using the classification result, a regression model generation unit that performs machine learning for each group, using the first data constituting the pair data and the second data constituting the same pair data, and generates a regression model indicating a relation with the first data and the second data.

20 Claims, 17 Drawing Sheets

Fig.13

NORTH LATITUDE A DEGREE
EAST LONGITUDE a DEGREE

| DATA NAME | VALUE |
|---|---|
| GEOSCIENTIFIC DATA | |
| COPPER CONTENT | 25ppm |
| SATELLITE DATA | |
| ASTER BAND DATA BAND 1 | 50 |
| ASTER BAND DATA BAND 14 | 100 |
| ASTER BAND INVERSE DATA BAND 1 ^ -1 | 5/225 |
| ELEVATION DATA | 1000m |
| ELEVATION SLOPE DATA | 15° |

Fig.15

| POINT (LATITUDE AND LONGITUDE) | GEOSCIENTIFIC DATA | VALUE OF GEOSCIENTIFIC DATA | SATELLITE DATA | VALUE OF SATELLITE DATA |
|---|---|---|---|---|
| NORTH LATITUDE L DEGREE EAST LONGITUDE m DEGREE | COPPER CONTENT | x | ELEVATION | 1000m |
| NORTH LATITUDE L DEGREE EAST LONGITUDE n DEGREE | COPPER CONTENT | y | ELEVATION | 1005m |
| NORTH LATITUDE L DEGREE EAST LONGITUDE o DEGREE | COPPER CONTENT | z | ELEVATION | 1020m |
| NORTH LATITUDE M DEGREE EAST LONGITUDE m DEGREE | COPPER CONTENT | z | ELEVATION | 1000m |
| NORTH LATITUDE M DEGREE EAST LONGITUDE n DEGREE | COPPER CONTENT | - | ELEVATION | 1005m |
| NORTH LATITUDE M DEGREE EAST LONGITUDE o DEGREE | COPPER CONTENT | x | ELEVATION | 1020m |
| NORTH LATITUDE O DEGREE EAST LONGITUDE m DEGREE | COPPER CONTENT | x | ELEVATION | 1000m |
| NORTH LATITUDE O DEGREE EAST LONGITUDE n DEGREE | COPPER CONTENT | y | ELEVATION | 1005m |
| NORTH LATITUDE O DEGREE EAST LONGITUDE o DEGREE | COPPER CONTENT | z | ELEVATION | 1020m |

CONVENTIONAL ESTIMATION METHOD

ESTIMATION METHOD OF THE EXAMPLE EMBODIMENT

DATA ANALYSIS APPARATUS, DATA ANALYSIS METHOD, AND COMPUTER-READABLE RECORDING MEDIUM

This application is a National Stage Entry of PCT/JP2019/024831 filed on Jun. 21, 2019, the contents of all of which are incorporated herein by reference, in their entirety.

TECHNICAL FIELD

The present invention relates to a data analysis apparatus and a data analysis method for analyzing geoscientific data indicating a characteristic of a specific region, for example, a content of substances existing on the ground surface, and further, and further relates to a computer-readable recording medium on which a program for realizing these is recorded.

BACKGROUND ART

A geoscientific data is data that represents a characteristics of geology, rock composition, vegetation, etc. at area where the geoscientific data was acquired. Specifically, examples of the geoscientific data include soil water content, soil element content, biomass content, mineral resource reserves, forest humidity distribution, and the like. However, in, itis difficult to acquire the geoscientific data over a wide area due to restrictions on human power, financial power, and equipment, and there are many missing data on a map.

Therefore, in order to acquire the wide-area geoscientific data, it is necessary to interpolate the missing data. That is, it is necessary to acquire a geoscientific data in an unknown area. For this reason, conventionally, the characteristics of an area where the geoscientific data is not acquired are estimated by using the geoscientific data acquired in a specific area.

For example, Patent Document 1 discloses a ground estimation method for estimating a geological distribution and geological properties of an area where boring is not performed by using boring data acquired at a plurality of area. Specifically, in the ground estimation method disclosed in Patent Document 1, first, based on geological characteristic values of each stratum included in each boring data, a contour map of the geological characteristic values is generated, for each stratum of an area to be estimated. At this time, the area to be estimated is an area including a place where a boring is performed. In other words, the boring is performed at multiple places in the area to be estimated. Next, a position of the ground estimation point is collated in the contour map of each stratum, and the geological characteristic value there is estimated. After that, the estimated geological characteristic values of each stratum are displayed.

As described above, in the ground estimation method disclosed in Patent Document 1, it is possible to estimate the geological characteristic value of the place where boring is not performed in the area to be estimated. However, in the ground estimation method disclosed in Patent Document 1, it is necessary to generate the contour map of the geological characteristic values. Therefore, the ground estimation method disclosed in Patent Document 1 has a problem that a place that can be estimated is limited to a vicinity of the place where the boring is performed.

On the other hand, recently, many estimation methods by machine learning have been proposed as a method for estimating characteristics of places where geoscientific data have not been acquired. In these estimation method, first, in order to estimate the characteristics of a place where a specific type of geoscientific data has not been acquired, a learning model is constructed using acquired other types of geoscientific data as training data. For example, more than a dozen types of remote sensing data, geomagnetic data, gravity data, contour line data, and the like are used the learning data.

Then, in the estimation method by machine learning, the characteristics in the place where the geoscientific data is not acquired can be estimated by the learning model constructed by the learning data.

Therefore, it is considered that the problem in Patent Document 1 can be solved by the estimation method by machine learning.

The estimation method by machine learning will be described in detail. Patent Document 2 discloses an estimation method in which remote sensing data is used as training data for machine learning, and a biomass is estimated using a model obtained by the machine learning. In the estimation method disclosed in Patent Document 2, an area to be analyzed is divided into meshes of a predetermined size predetermined on a map. For each divided mesh, actually measured resource information is applied to a model, and a biomass existing in the mesh is estimated.

LIST OF RELATED ART DOCUMENTS

Patent Documents

Patent Document 1: Japanese Patent Laid-Open Publication No. 2012-37427
Patent Document 2: Japanese Patent Laid-Open Publication No. 2004-89032

SUMMARY OF INVENTION

Problems to be Solved by the Invention

Incidentally, such geoscientific data has a feature that a dynamic scale is very large. Therefore, values of the geoscientific data may range from 10 minus power to 10 plus power (see FIG. 3($a$) described later) even though they are the same index. However, even if the values are widespread, the values of the geoscientific data will be low in most areas and only locally high in an entire map of an area of interest. In other words, a gradient between a high value area of the geoscientific data and a low value area of the geoscientific data is steep, and the high value area is specifically distributed.

Regions that are specifically distributed in the entire geoscientific data need to be treated as meaningful information in the estimation process. However, in the estimation method by machine learning disclosed in Patent Document 2 described above, such estimation processing is not performed. Therefore, in the estimation method by machine learning disclosed in Patent Document 2 described above, an important information in the geoscientific data which is the learning data is ignored, so that there is a problem that the estimation accuracy is low.

Specifically, in the estimation method by machine learning disclosed in Patent Document 2, it is assumed that a data in a region having a high value is used as a response variable in the training data. In this case, at a stage of data preprocessing, the data in the region having the high value is recognized as a singular point and the removed. Alternatively, the data in the region having the high value is ignored in the machine learning model because an amount of data is small. As a result, as described above, there is the problem that the estimation accuracy is low.

An example object is to solve the aforementioned problem, and to provide a data analysis apparatus, a data analysis method, and a computer-readable recording medium that can improve the estimation accuracy in data estimation using machine learning.

Means for Solving the Problems

In order to achieve the above-described object, a data analysis apparatus according to an example aspect of the invention includes:
- an align unit configured to acquire a pair data of a first data indicating a characteristic of a specific region and a second data corresponding to the first data and indicating another characteristic of the specific region, and align the first data in order of their sizes,
- a classification model generation unit configured to perform grouping a data set of the pair data based on a characteristic of an order distribution of the first data after alignment, classify the data set of the pair data into a plurality of groups, and generate a classification model for classifying the pair data using the classification result,
- a regression model generation unit configured to perform machine learning for each group, using the first data constituting the pair data as a response variable and the second data constituting the same pair data as an explanatory variable, and generate a regression model indicating a relation with the first data and the second data.

In addition, in order to achieve the above-described object, A data analysis method according to an example aspect of the invention includes:
- (a) a step of acquiring a pair data of a first data indicating a characteristic of a specific region and a second data corresponding to the first data and indicating another characteristic of the specific region, and aligning the first data in order of their sizes,
- (b) a step of performing grouping a data set of the pair data based on a characteristic of an order distribution of the first data after alignment, classifying the data set of the pair data into a plurality of groups, and generating a classification model for classifying the pair data using the classification result,
- (c) a step of performing machine learning for each group, using the first data constituting the pair data as a response variable and the second data constituting the same pair data as an explanatory variable, and generating a regression model indicating a relation with the first data and the second data.

Furthermore, in order to achieve the above-described object, a computer readable recording medium according to an example aspect of the invention that includes a program recorded thereon, the program including instructions that cause a computer to carry out:
- (a) acquiring a pair data of a first data indicating a characteristic of a specific region and a second data corresponding to the first data and indicating another characteristic of the specific region, and aligning the first data in order of their sizes,
- (b) performing grouping a data set of the pair data based on a characteristic of an order distribution of the first data after alignment, classifying the data set of the pair data into a plurality of groups, and generating a classification model for classifying the pair data using the classification result,
- (c) performing machine learning for each group, using the first data constituting the pair data as a response variable and the second data constituting the same pair data as an explanatory variable, and generating a regression model indicating a relation with the first data and the second data.

Advantageous Effects of the Invention

As described above, according to the present invention, it is possible to improve the estimation accuracy in data estimation using machine learning.

BRIEF DESCRIPTION OF THE DRAWINGS

FIG. 13 is a diagram illustrating a sample data at a specific point used in a specific example.

FIG. 14 is a diagram illustrating an example of a satellite data used in the specific examples.

FIG. 15 is a diagram illustrating an example of a data group of sample data used in the specific example.

FIG. 17 is a diagram illustrating a relationship between a predicted value and a true value.

EXAMPLE EMBODIMENT

Example Embodiment

The following describes a data analysis apparatus, a data analysis method, and a program according to a first example embodiment with reference to FIGS. 1 to 5.

Apparatus Configuration

Figure 1:
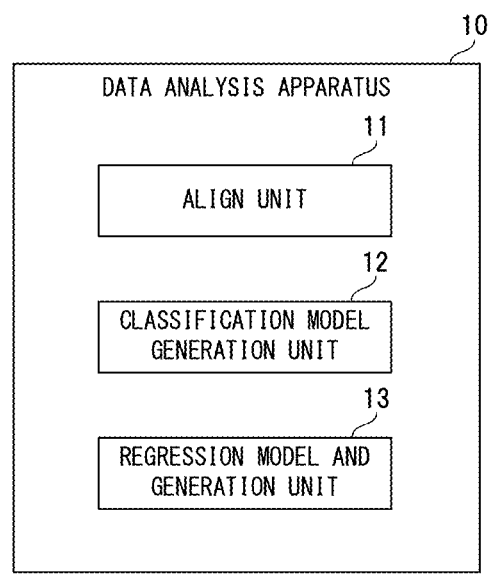
FIG. 1 is a block diagram schematically illustrating a configuration of a data analysis apparatus according to a first example embodiment.

First, a configuration of the data analysis apparatus according to the first present example embodiment will be described. FIG. 1 is a block diagram schematically illustrating a configuration of a data analysis apparatus according to a first example embodiment. A data analysis apparatus 10 according to the first example embodiment shown in FIG. 1 is an apparatus for analyzing a data representing a characteristic of a specific region. As shown in FIG. 1, the data analysis apparatus 10 includes an align unit 11, a classification model generation unit 12, a regression model and generation unit 13.

The align unit 11 acquires a pair data of a first data indicating a characteristic of a specific region and a second data, and aligns the first data in order of their sizes. The second data is corresponding to the first data and indicating another characteristic of the specific region.

The classification model generation unit 12 performs grouping a data set of the pair data based on a characteristic of an order distribution of the first data after alignment, and classifies the data set of the pair data into a plurality of groups. Further, the classification model generation unit 12 generates a classification model for classifying the pair data using the classification result, The regression model generation unit 13 performs machine learning for each group, using the first data constituting the pair data as a response variable and the second data constituting the same pair data as an explanatory variable, and generates a regression model indicating a relation with the first data and the second data.

As described above, in the first example embodiment, the pair data is grouped according to a size of the first data, and the regression model is created for each group. Therefore, even if the data has a specific distribution like the geoscientific data, the specific part is not removed or ignored, and the entire data is included in the learning model. Thus, according to the first example embodiment, the estimation accuracy can be improved in data estimation using machine learning.

Figure 2:
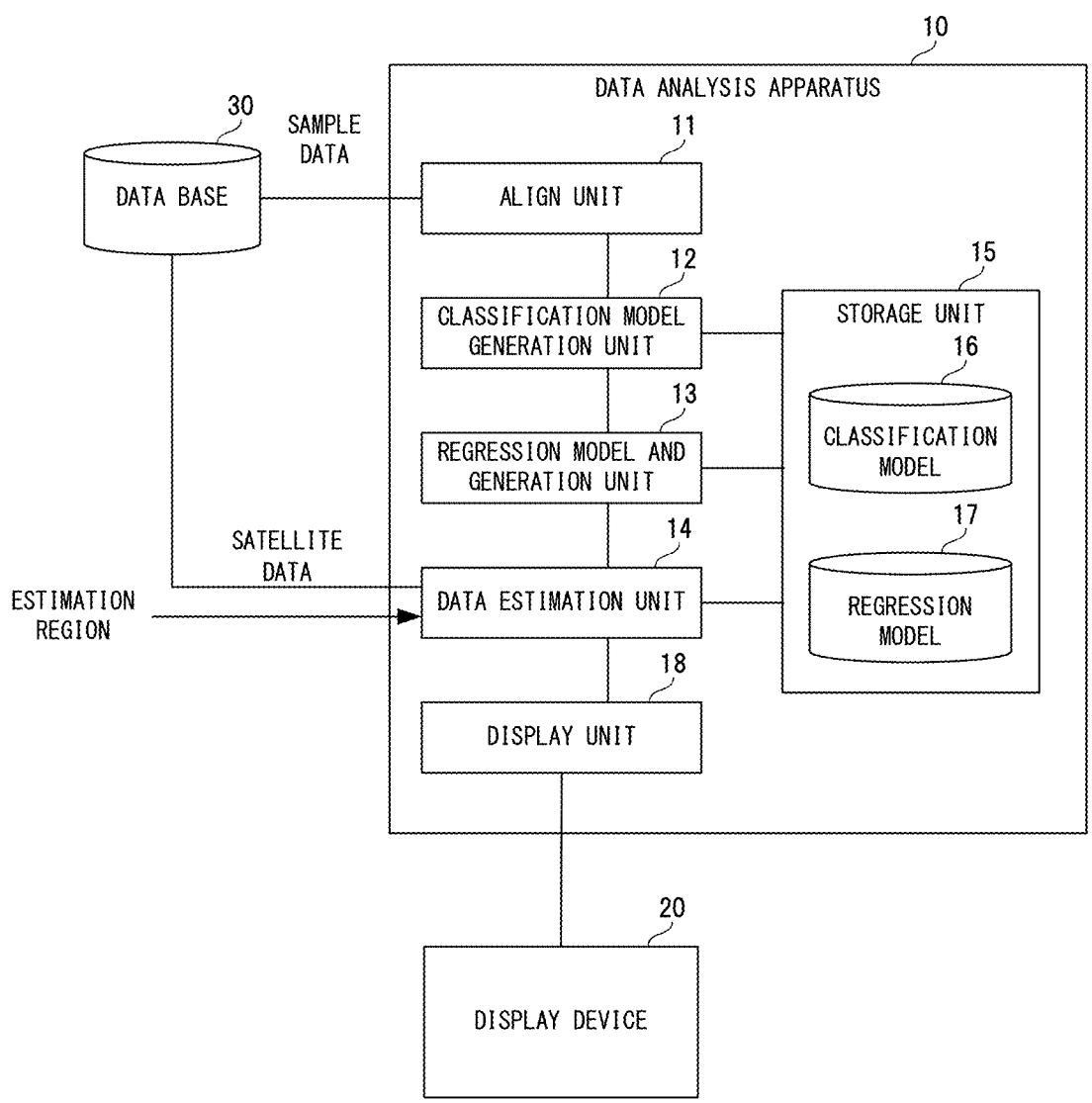
FIG. 2 is a block diagram specifically illustrating the configuration of the data analysis apparatus according to the first example embodiment.

Next, the configuration of the data analysis apparatus 10 according to the first example embodiment will be described more specifically with reference to FIGS. 2 to 3. FIG. 2 is a block diagram specifically illustrating the configuration of the data analysis apparatus according to the first example embodiment.

First, in the first example embodiment, the align unit 11 acquires a geoscientific data showing a characteristics of the specific region as the first data, and a satellite data showing other characteristics of the specific region as the second data. Here, as an example of the geoscientific data, there is data indicating an existence of resources as the characteristic of a specific region. For example, the geoscientific data is data showing substances on the surface of the earth, types of elements, component ratios, contents, etc. Specifically, it is assumed that a prediction of copper content is required in a certain region. An example of the geoscientific data includes data showing the copper content (ppm) per unit area, which is a characteristic of a specific region.

Other geoscientific data include gravity value, carbon dioxide concentration profile, temperature, humidity, wind direction, wind velocity, pressure, total solar radiation, spectroscopic radiation, photosynthetic effective radiation, ground temperature, soil moisture, ground flow heat, direct radiation spectrum, ground stability, strata age, fault information, groundwater vein information, plant type distribution, evapotranspiration information, and mineral production, etc.

In addition, when the analysis of the data is aimed at exploring or grasping an existence of a specific resource, it is preferable to use the data related to the existence of the resource as the geoscientific data. For example, the analysis of the data is aimed at grasping the existence of a specific element existing in crust, or at calculating an existence probability of a vein. In this case, the geoscientific data includes data showing an abundance ratio of an element to be grasped.

The satellite data is data obtained from the sky above the earth and indicates the characteristics of a specific area. The satellite data includes data acquired by satellites and data acquired by flying objects such as aircraft.

Further, as the satellite data that can be used in the first example embodiment, a data showing an intensity of electromagnetic wave reflected or radiated from a region to be acquired, a data showing a distribution of reflectance of light of a specific wavelength, a geomagnetism data, an elevation data, an elevation slope data, and the like.

Specifically, as the data showing the distribution of reflectance of light of the specific wavelength, there is a data measured by ASTER (Advanced Spaceborne Thermal Emission and Reflection Radiometer). The ASTER is an optical sensor for observation onboard NASA's Terra satellite, which can observe 14 bands from visible to thermal infrared. In addition, these 14 band are wavelength suitable for capturing a characteristic spectrum of minerals. The satellite data is not limited to the above, but includes a data obtained by remote sensing.

Further, as shown in FIG. 2, in the first example embodiment, the data analysis apparatus 10 includes a data estimation unit 14, a display unit 18, and a storage unit 15 in addition to the align unit 11, the classification model generation unit 12, and the regression model generation unit 13. The display device 20 is connected to the data analysis apparatus 10. Further, the data analysis apparatus 10 is also connected to the data base 30 via a network or the like.

Database 30 stores the geoscientific data and the satellite data in the specific region. For example, it is assumed that the geoscience data is a data indicating the copper content (ppm) per unit area at each point, and the satellite data is a data indicating the distribution of reflectance of light of the specific wavelength, the elevation data, and the elevation slope data.

In this case, the database 30 stores, for each point (latitude and longitude), the data indicating the copper content (ppm) per unit area as the geoscientific data, and reflectance of light of the specific wavelength, elevation values, and slope values as the satellite data. Further, in this case, a setting range centered on a point where the geoscientific data is acquired, and a setting range centered on a point where the satellite data is acquired are superimposed. The obtained area is regarded as the specific region.

Furthermore, in the database 30, the value of the geoscientific data and the value of the satellite data are associated with each other as one set, for each point. Moreover, the values of the geoscientific data and the values of the satellite data constituting one pair data are treated as one sample data (the pair data).

Since the satellite data can be acquired in a wider range than the geoscientific data, the satellite data may cover a region other than the specific region in which the geoscientific data is acquired.

Figure 3A:
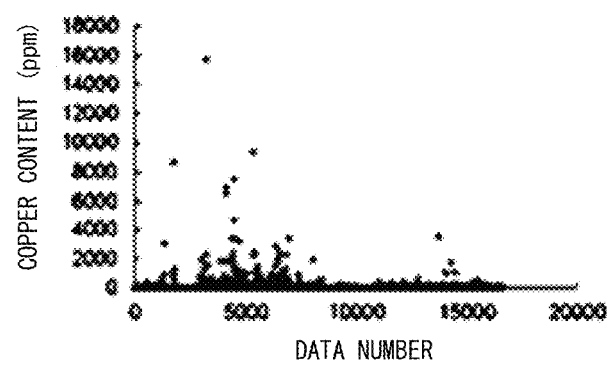
FIG. 3A illustrates a distribution of a geoscientific data before alignment.
Figure 3B:
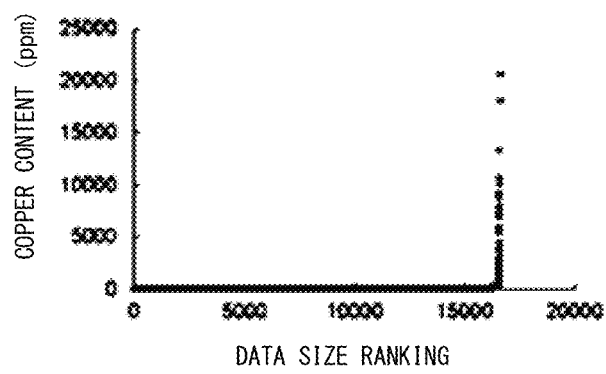
FIG. 3B illustrates a distribution of the geoscientific data after alignment. The distribution illustrated in FIG. 3B is an ordinal distribution.

In the first example embodiment, the align unit 11 acquires a pair data of the geoscientific data and the satellite data as the pair data of the first data and the second data from the database 30. Then, the align unit 11 aligns the geoscientific data shown in FIG. 3A in the order of their sizes, as shown in FIG. 3B. FIG. 3A illustrates a distribution of the geoscientific data before alignment, and FIG. 3B illustrates a distribution of the geoscientific data after alignment. The distribution illustrated in FIG. 3B is an ordinal distribution.

Further, the align unit 11 also aligns the satellite data according to the order of the corresponding geoscientific data. Note that "alignment" here is synonymous with sorting. Further, the align unit 11 passes the aligned geoscientific data and satellite data to the classification model generation unit 12 and the regression model generation unit 13.

In the first example embodiment, the classification model generation unit 12 first receives a data group (a plurality of sample data) of the sample data aligned by the align unit 11. Further, as shown in FIG. 3B, in the geoscientific data, most of regions have low values (hereinafter referred to as "low value region"). Regions having high values (hereinafter referred to as "high value region") exist only locally. Therefore, in the first example embodiment, the classification model generation unit 12 divides the data group of the received sample data into two groups, a high value region and a low value region, based on the threshold value S. In the first example embodiment, the number of groups is not particularly limited.

Specifically, the classification model generation unit 12 can determine the group to which each sample data belongs by inputting each sample data to a support vector machine for grouping. For example, it is assumed that the sample data is a pair data of the copper content (ppm) and the satellite data. The support vector machine then learns the characteristics of the copper content data distribution, determines a threshold value for dividing the copper content into two groups, and divides the sample data into two based on the determined threshold value. The threshold value may be a preset fixed value.

Then, the classification model generation unit 12 labels the sample data according to the grouping, executes machine learning using the sample data after labeling as training data, and generates a classification model 16 for classifying the pair data of the geoscience data and the satellite data. The machine learning methods used in this case include decision tree, support vector machine, neural network, logistic regression, nearest neighbor classification method (K-NN: k-nearest neighbor algorithm), ensemble classification learning method, and discriminant analysis, and the like. Furthermore, the classification model generation unit 12 stores the generated classification model 16 in the storage unit 15.

In addition, the classification model generation unit 12, with each sample data, learns the relationship between the high value region and the low value region in the geoscience data, and the satellite data (reflectance of light of the specific wavelength, elevation value, and slope value) by deep learning.

In this case, since a classifier that determine the sample group according to the value of the satellite data is generated, the generated classifier can be used as the classification model 16.

In the first example embodiment, the regression model generation unit 13 first acquires the sample data group grouped by the classification model generation unit 12. Then, the regression model generation unit 13 executes machine learning using each the acquired sample data as training data. As a result, the regression model 17 is generated. The machine learning methods used here include Gaussian process regression, decision trees, support vector machines, neural networks, logistic regression, nearest neighbor classification method (K-NN: k-nearest neighbor algorithm), ensemble regression learning method, discriminant analysis, and the like.

Specifically, the regression model generation unit 13 input the sample data constituting the group to the support vector machine for each group. The support vector machine learns relationship between a characteristics of the specific region indicated by the geoscientific data and a characteristics of the specific region indicated by the satellite data. Examples of this relationship include the relationship between the copper content (ppm) and any of the reflectance, elevation value, and inclination value of light having a specific wavelength. Then, the regression model generation unit 13 generates a regression model 17. For example, when reflectance of light of a specific wavelength, elevation value, and inclination value are input, the regression model 17 outputs the copper content according to the input value. Further, in this case, the sample data is grouped in advance, and the regression model is generated for each group. After that, the regression model generation unit 13 also stores the generated regression model 17 in the storage unit 15. The regression model for each group may be the same regression model or different regression models.

In addition, the regression model generation unit 13 can also learn a relationship between the characteristics of the specific region indicated by the geoscientific data and the characteristics of the specific region indicated by the satellite data by performing deep learning using each sample data. In this case, a model learned by deep learning becomes the regression model 17 that determines the copper content according to reflectance of light having a specific wavelength, elevation value, inclination value, and the like, which is satellite data.

The data estimation unit 14 applies the second data in a region other than the specific region to the classification model 16 and the regression model 17 to estimate the first data in the region other than the specific region.

In the first example embodiment, the data estimation unit 14 first inputs the satellite data in the region other than the specific region (hereinafter referred to as "estimation region") into the classification model 16 generated by the classification model generation unit 12, to classify this satellite data into multiple groups.

Next, the data estimation unit 14 inputs the satellite data of the corresponding group into each of the regression models generated for each group by the regression model generation unit 13, to estimate the geoscientific data in the estimation region.

Specifically, when the estimation region is designated from the outside, the data estimation unit 14 first selects a plurality of points (latitude and longitude) from the designated estimation region. Next, the data estimation unit 14 specifies reflectance of light of a specific wavelength, altitude value, and inclination value corresponding to the selected point from the satellite data stored in the database 30.

Further, the data estimation unit 14 applies the specified data to the classification model 16 to determine which of the two groups, the low value region and the high value region, belongs to these data.

After that, the data estimation unit 14 applies the satellite data to the regression model 17 corresponding to the group determined to belong, and calculates the copper content in the estimation region.

The display unit 18 superimposes the first data in the specific region and the first data in the estimation region on the screen. In the first example embodiment, the display unit 18 superimposes the geoscientific data in the specific region, the geoscientific data in the estimation region, and a map data on the screen of the display device 20. Specifically, for example, it is assumed that the geoscientific data is the copper content (ppm) per unit area for each point.

In this case, the display unit 18 displays the copper content (predicted value) on the screen of the display device 20 even at points where the copper content is not specified. Therefore, the user of the data analysis apparatus 10 can formulate an efficient mining plan.

Apparatus Operations

Next, the operations of the data analysis apparatus 10 according to the first example embodiment will be described using FIGS. 4 and 5. Further, as will be described later, in the first example embodiment, the data analysis apparatus 10 performs a calibration operation and an estimation operation. In the following description, FIG. 1 to FIG. 3 will be referred to as appropriate. Furthermore, in the first example embodiment, the data analysis method is implemented by operating the data analysis apparatus 10. Therefore, the following description of the operations of the data analysis apparatus 10 applies to the data analysis method according to the first example embodiment.

First, the calibration operation, that is, the process of generating the classification model and the regression model will be described with reference to FIG. 4. FIG. 4 is a flow diagram illustrating a calibration operation of the data analysis apparatus according to the first example embodiment of the present invention.

Figure 4:
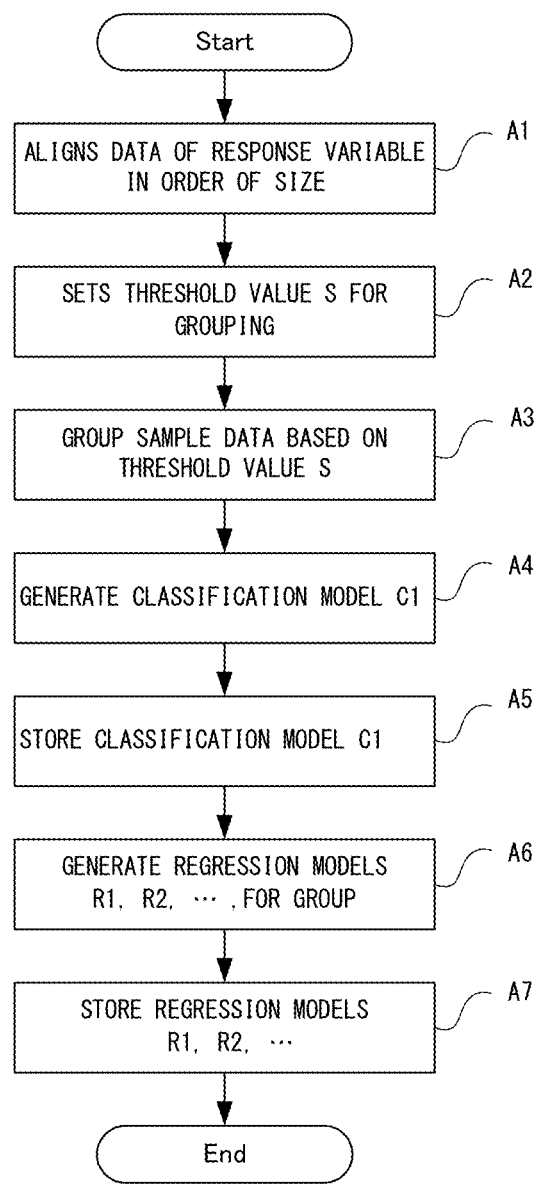
FIG. 4 is a flow diagram illustrating a calibration operation of the data analysis apparatus according to the first example embodiment.

As shown in FIG. 4, first, the align unit 11 acquires the geoscientific data and the satellite data in a specific region as sample data from the database 30. Then, the align unit 11 aligns the geoscientific data in order of the size of the geoscientific data as the response variable, and further aligns the satellite data in the order of the corresponding geoscientific data (step A1).

Specifically, in step A1, the align unit 11 acquires the pair data of the geoscience data and the satellite data from the database 30 for each point included in the specific region as the acquired sample data, and align the sample data group for each point. Further, the align unit 11 passes the sample data group after alignment to the classification model generation unit 12.

Next, the classification model generation unit 12 sets a threshold value S (reference value) for grouping based on a certain rule according to the characteristics of the geoscientific data (step A2). Specifically, in step A2, when the classification model generation unit 12 receives the sample data for each point aligned in step A1, the classification model unit 12 sets the threshold value S using the support vector machine.

Next, the classification model generation unit 12 groups the geoscientific data and satellite data aligned in step A1 based on the threshold value S determined in step A2 (step A3).

Specifically, in step A3, the classification model generation unit 12 divides the sample data group into two groups, the high value region and the low value region, based on the determined threshold value S. That is, the classification model generation unit 12 classifies the geoscientific data larger than the threshold value S and the satellite data corresponding to the point of that geoscientific data into the H group. And the classification model generation unit 12 classifies the geoscientific data smaller than the threshold value S and the satellite data corresponding to the point of that geoscientific data into the L group. The classification model generation unit 12 can also determine the threshold value S according to the geoscientific data, as shown in the second example embodiment described later.

Next, the classification model generation unit 12 generates the classification model 16 (C1) for classifying the pair data using the grouping result of step A3 (step A4).

Specifically, the classification model generation unit 12 assigns a label to the satellite data of the grouped sample data, and constitutes a data set with the satellite data of the sample data and the label assigned to the sample data. Next, the classification model generation unit 12 executes classification learning using the data set as training data to generate the classification model for classifying the pair data of the geoscientific data and the satellite data.

Next, the classification model generation unit 12 stores the classification model 16 (classification model C1) generated in step A4 in the storage unit 15 (step A5).

Next, the regression model generation unit 13 acquires the sample data group grouped in step A2. And the regression model generation unit 13 learns a correlation between the characteristics of the specific region indicated by the geoscientific data and the characteristics of the specific region indicated by the satellite data for each group using each the sample data as training data, thereby generating the regression model 17 (step A6). Further, the regression model generation unit 16 can execute step A6 at the same time as the classification model 16 is generated by the classification model generation unit 12 after the sample data is grouped in step A3.

Specifically, the regression model generation unit 13 acquires the sample data for each point grouped in step A2, and executes regression learning for each group using each the acquired sample data as training data, thereby generating the regression model 17. The regression model generation unit 13 generates the regression model for each group. That is, the regression model generation unit 13 generates a regression model R1 for the H group and generates a regression model R2 for the L group.

After that, the regression model generation unit 13 stores the regression model 17 (regression models R1 and R2) generated in step A6 in the storage unit 15 (step A7). By executing step A7, the calibration operation is completed.

Subsequently, the estimation operation, that is, the estimation process using the classification model 16 and the regression model 17 will be described with reference to FIG. 5. FIG. 5 is a flow diagram illustrating an estimation operation of the data analysis apparatus according to the first example embodiment.

Figure 5:
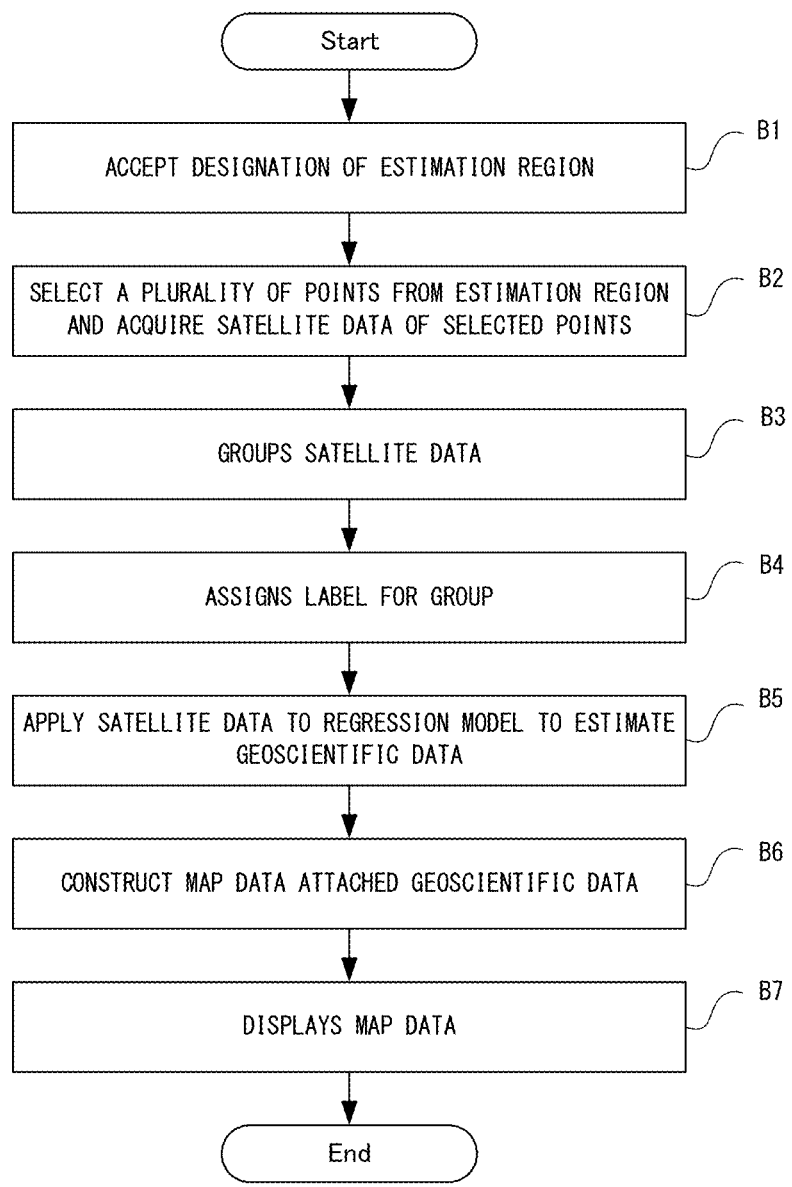
FIG. 5 is a flow diagram illustrating an estimation operation of the data analysis apparatus according to the first example embodiment.

As shown in FIG. 5, first, the data estimation unit 14 accepts the designation of the estimation region from the outside (step B1). Next, the data estimation unit 14 selects a plurality of points (latitude and longitude) from the designated estimation region, and acquires the satellite data of the selected points from the database 30 (step B2).

Next, the data estimation unit 14 inputs the satellite data acquired in step B2 into the classification model 16 (C1) and groups the satellite data (step B3).

After that, the data estimation unit 14 assigns a label to the satellite data acquired in step B2 based on the grouping result in step B1 (step B4).

Specifically, by grouping in step B3, it can be determined whether the estimation region designated in step B1 belongs to the H group or the L group.

Therefore, the data estimation unit 14 assigns "H" or "L" as a label to the satellite data acquired in step B2 based on the determination result.

Next, the data estimation unit 14 applies the satellite data to which the label is assigned in step B4 to the regression model 17 to which the label corresponds to estimate the geoscientific data in the estimation region (step B5).

For example, when the label assigned to the satellite data is H, the data estimation unit 14 applies the satellite data to the regression model R1. On the other hand, when the label assigned to the satellite data is L, the data estimation unit 14 applies the satellite data to the regression model R2.

Next, the data estimation unit 14 combines the result of step B5 with the geoscientific data in other regions already acquired on the map data based on the longitude and latitude of the point, thereby constructing the map data attached the geoscientific data (step B6). Furthermore, the data estimation unit 14 outputs the constructed map data to the display unit 18.

Next, the display unit 18 receives the output map data and displays the map data constructed in step B6 on the screen of the display device 20 (step B7).

As a result, the geoscientific data in the estimation region and the geoscientific data in a region other than the estimation region (including the specific region) are displayed superimposed on the map data, on the screen.

Effects of First Example Embodiment

As described above, in the first example embodiment, the classification model for grouping the geoscientific data and the regression model for defining the relationship between the geoscientific data and satellite data for each group are generated. Therefore, according to the first example embodiment, even the geoscientific data having a specific distribution can be estimated with high accuracy from the satellite data.

Program

It is sufficient that the program according to the first example embodiment be a program that causes a computer to execute steps A1 to A10 illustrated in FIG. 4 and steps B1 to B7 illustrated in FIG. 5. The data analysis apparatus 10 and the data analysis method according to the first example embodiment can be realized by installing this program in the computer and executing this program. In this case, a processor of the computer functions and performs processing as the align unit 11, the classification model generation unit 12, the regression model generation unit 13, the data estimation unit 14, and the display unit 18.

Also, the program according to the first example embodiment may be executed by a computer system constructed by a plurality of computers. In this case, for example, each computer may function as one of the align unit 11, the classification model generation unit 12, the regression model generation unit 13, the data estimation unit 14, and the display unit 18.

Second Example Embodiment

In the following, a data analysis apparatus, a data analysis method, and a program according to a second example embodiment will be described.

First, the data analysis apparatus according to the second example embodiment has the same configuration as the data analysis apparatus 10 according to the first example embodiment shown in FIGS. 1 and 2. Therefore, in the following description, FIGS. 1 to 3 will be referred to. However, the data analysis apparatus according to the second example embodiment is different from the data analysis apparatus 10 according to the first example embodiment in the function of the classification model generation unit 12. In the following, the differences from the first example embodiment will be mainly described.

In the second example embodiment, the classification model generation unit 12 determines the threshold value S for appropriate grouping before generating the classification model 16. The classification model generation unit 12 executes a linear regression on a part of the geoscientific data based on an order distribution of the aligned geoscientific data, and calculates an approximate straight line. Further The classification model generation unit 12 set the threshold value S using the calculated approximate straight line. Then, the classification model generation unit 12 performs grouping using the set threshold value S.

As described above, the geoscientific data is a general term for various types of data, and its numerical range differs depending on a type of the data.

Therefore, the threshold value S for grouping needs to be determined according to a characteristics of the data, and in fact, it is very important to set the threshold value S appropriately in order to realize highly accurate estimation of the geoscientific data.

Further, the reason why the appropriate setting of the threshold value is important is that the learning accuracy is higher when the training data group having similar characteristics is used in generating of the learning model. On the other hand, as shown in FIG. 3A, the geoscientific data has a range from 10 minus power to 10 plus power, and in the distribution of the geoscientific data, most regions are low values and only locals are high values. In addition, as shown in FIG. 3B, when the geoscientific data are arranged in the order of small to large, only a value of the geoscientific data of 1% of the last rank rises sharply. The value of 1% of the geoscientific data in the final ranking has changed by several orders of magnitude compared to a value of the other about 99% of the geoscientific data. Therefore, in order to separate parts that differ numerically, it is necessary to set an appropriate threshold value as much as possible when grouping and to make data characteristics of each group uniform.

Figure 6:
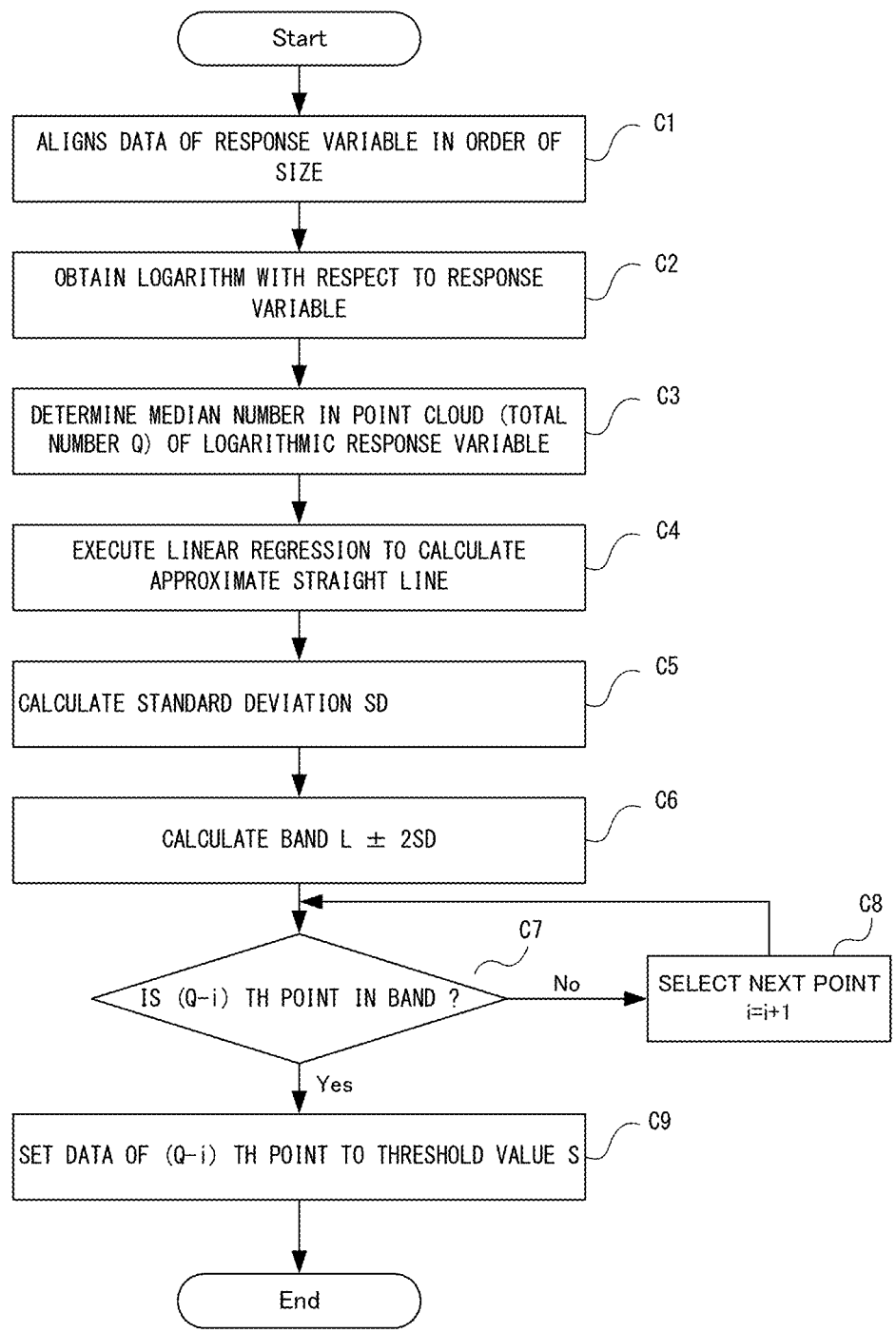
FIG. 6 is a flow diagram illustrating a threshold setting operation of the data analysis device according to the second example embodiment.

Here, the operation of the data analysis apparatus according to the second example embodiment will be described with reference to FIGS. 6 to 9. FIG. 6 is a flow diagram illustrating a threshold setting operation of the data analysis apparatus according to the second example embodiment.

Further, each step shown in FIG. 6 is performed after the process shown in FIGS. 3A and 3B is executed by the align unit 11.

As shown in FIG. 6, first, the align unit 11 acquires the geoscientific data and the satellite data in a specific region as the sample data from the database 30. Then, the align unit 11 aligns the geoscientific data in the order of the size of the geoscientific data as the response variable, and further aligns the satellite data in the order of the corresponding geoscientific data (step C1). Step C1 is the same step as step A1 shown in FIG. 4.

Figure 7A:
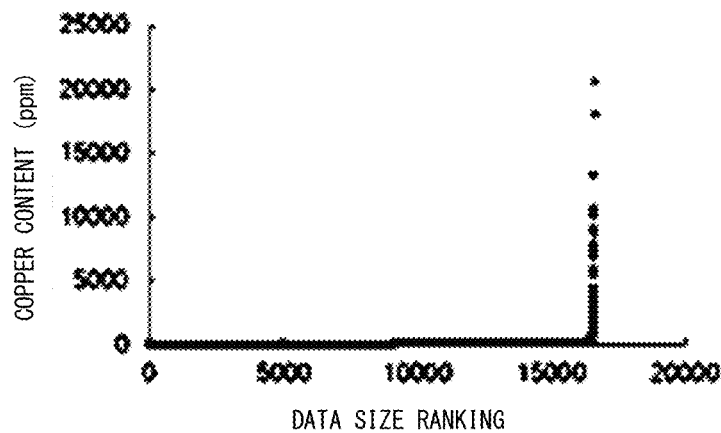
FIG. 7A illustrates a distribution of the geoscientific data after alignment.
Figure 7B:
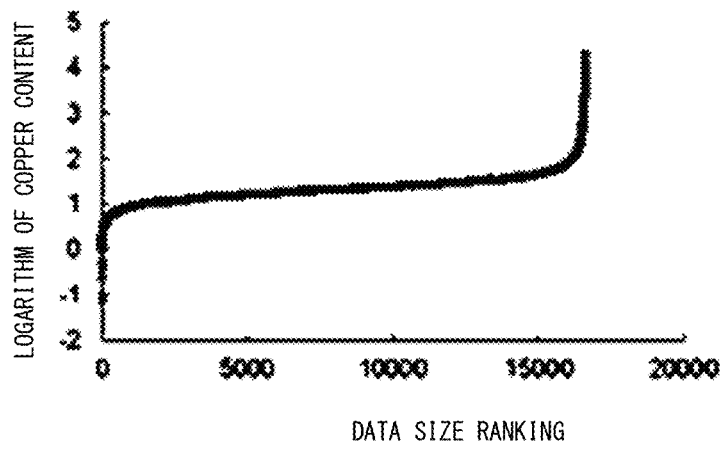
FIG. 7B illustrates a state in which a vertical axis of the distribution illustrated in FIG. 7A is logarithmic in the second example embodiment.

Next, the classification model generation unit 12 obtains a logarithm with respect to the geoscientific data (see FIG. 3B) aligned in order of size in step C1, that is, the response variable (step C2). Specifically, as shown in FIGS. 7A and 7B, in the graph of the geoscientific data aligned in the order of size, the vertical axis is logarithmic. FIG. 7A illustrates a distribution of the geoscientific data after alignment, and FIG. 7B illustrates a state in which a vertical axis of the distribution illustrated in FIG. 7A is logarithmic in the second example embodiment.

Figure 8:
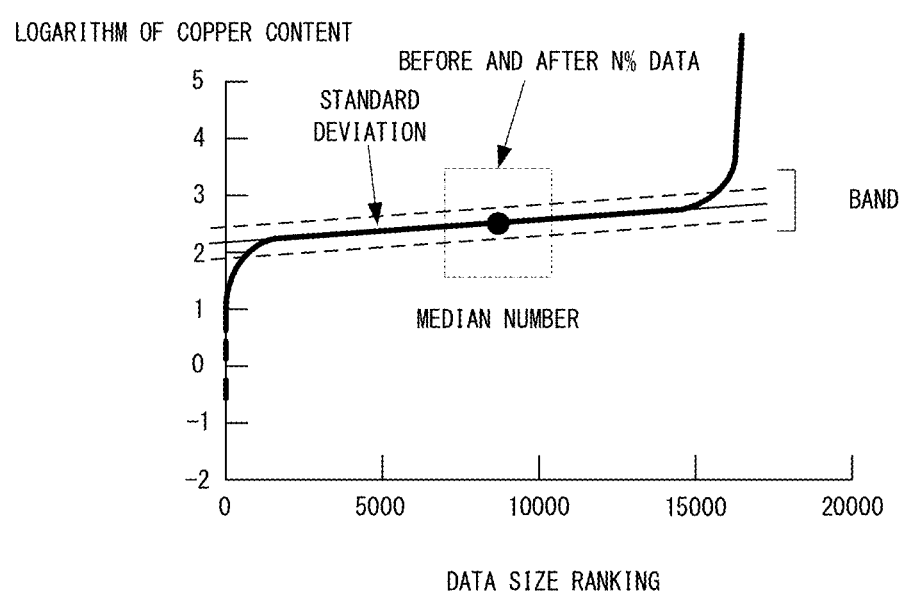
FIG. 8 is a diagram illustrating an example of a median number and standard deviation in the geoscientific data represented by the logarithm in the example embodiment.

Further, as shown in FIG. 8, the classification model generation unit 12 determines a median number in a point cloud of the logarithmic geoscientific data (total number Q) (step C3). Moreover, as shown in FIG. 8, the classification model generation unit 12 specifies an order of the median number of the point group of the total number Q. And the classification model generation unit 12 executes a linear regression using the point cloud of N % (total 2N %%) before and after the specified median number to calculate an approximate straight line (step C4). FIG. 8 is a diagram illustrating an example of a median number and standard deviation in the geoscientific data represented by the logarithm in the example embodiment.

Next, as shown in FIG. 8, the classification model generation unit 12 calculates a standard deviation SD with respect to the approximate straight line calculated in step C4 in the point cloud of N % (total 2N %%) before and after the median number (Step C5). Further, the classification model generation unit 12 calculates a band L+ or −2SD of the geoscientific data (step C6).

Next, the classification model generation unit 12 determines whether or not each data fits in the band calculated in step C2 in order from the maximum value to the minimum value of the point cloud (step C7). As a result of the determination in step C7, if the target point is not within the band, the next point is selected (step C8), and step C7 is executed again.

On the other hand, as a result of the determination in step C7, if the target point is within the band, the value of the first point within the band is set as the threshold value S (step C9). When the threshold value S is determined in step C9, the classification model generation unit 12 executes grouping with a point at which the threshold value S is reached as a boundary.

Figure 9:
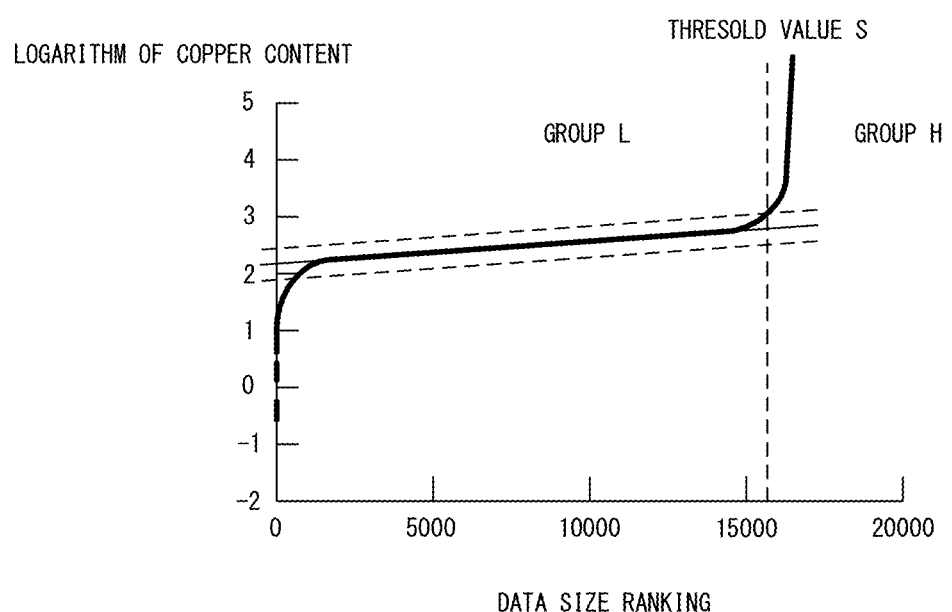
FIG. 9 is a diagram illustrating an example of grouping results according to the second example embodiment.

Specifically, as shown in FIG. 9, the classification model generation unit 12 classifies the point cloud having the threshold value S or less into the group L, and the point cloud having the threshold value S or more into the group H. FIG. 9 is a diagram illustrating an example of grouping results according to the second embodiment.

Further, in the second example embodiment, after the execution of steps C1 to C9 shown in FIG. 8, the data analysis apparatus executes steps A3 to A7 shown in FIG. 4 and steps B1 to B7 shown in FIG. 5.

Effect of Second Example Embodiment

As described above, in the second example embodiment, the threshold value for grouping the pair data is automatically set with high accuracy. Therefore, according to the second example embodiment, a highly accurate classification model is generated, so that the estimation accuracy can be improved.

Program

It is sufficient that the program according to the second example embodiment be a program that causes a computer to execute steps C1 to C10 illustrated in FIG. 6, steps A3 to A7 illustrated in FIG. 4 and steps B1 to B7 illustrated in FIG. 5. The data analysis apparatus and the data analysis method according to the second example embodiment can be realized by installing this program in the computer and executing this program. In this case, a processor of the computer functions and performs processing as the align unit 11, the classification model generation unit 12, the regression model generation unit 13, the data estimation unit 14, and the display unit 18.

Also, the program according to the second example embodiment may be executed by a computer system constructed by a plurality of computers. In this case, for example, each computer may function as one of the align unit 11, the classification model generation unit 12, the regression model generation unit 13, the data estimation unit 14, and the display unit 18.

Third Example Embodiment

In the following, a data analysis apparatus, a data analysis method, and a program according to a third example embodiment will be described.

First, the data analysis apparatus according to the third example embodiment has the same configuration as the data analysis apparatus 10 according to the first example embodiment shown in FIGS. 1 and 2. Therefore, in the following description, FIGS. 1 to 3 will be referred to. However, the data analysis apparatus in the third example embodiment is different from the data analysis apparatus 10 in the first and second example embodiments in the functions of the classification model generation unit 12 and the regression model generation unit 13. In the following, the differences from the first and second example embodiments will be mainly described.

In the third example embodiment, the classification model generation unit 12 sets a plurality of threshold values S, performs grouping for each set threshold value, and generates the classification model 16. Then, the classification model generation unit 12 causes the regression model generation unit 13 to generate the regression model 17 for each group obtained by grouping for each threshold value S. Subsequently, the classification model generation unit 12 causes the data estimation unit 14 to apply the sample data of satellite data to the classification model and regression model generated for each threshold S, and to estimate the geoscientific data in a region other than the specific region. After that, the classification model generation unit 12 obtains an evaluation index for evaluating a performance of the generated regression model 17 from the estimation result of the geoscientific data for each threshold value S. Further, the classification model generation unit 12 determines an optimum value of the threshold value S using the obtained evaluation index for each threshold value.

That is, in the data analysis apparatus according to the third example embodiment, the threshold value S is set a plurality of times before the estimation operation is started, and then the regression model 17 is recursively generated and the data is recursively estimated by cross-validation. The evaluation index for evaluating the regression model 17 is obtained a plurality of times. Then, the optimum threshold value S is determined from the relationship between the threshold value S and the evaluation index. This flow is necessary to maximize estimation accuracy of geoscientific data.

Furthermore, in the third example embodiment, a coefficient of determination $R^2$ obtained by cross validation is used as the evaluation index.

The coefficient of determination $R^2$ is obtained by evaluating a linearity of a graph obtained by setting a true value of the response variable as the horizontal axis and the predicted value as the vertical axis, and by plotting points corresponding to the response variable and the predicted value. The coefficient of determination $R^2$ is an evaluation index indicating what percentage of data could be effectively explained in the generated model, "1" means that 100% of data could be effectively explained, and "0" means that the generated model cannot explain data effectively at all.

Figure 10:
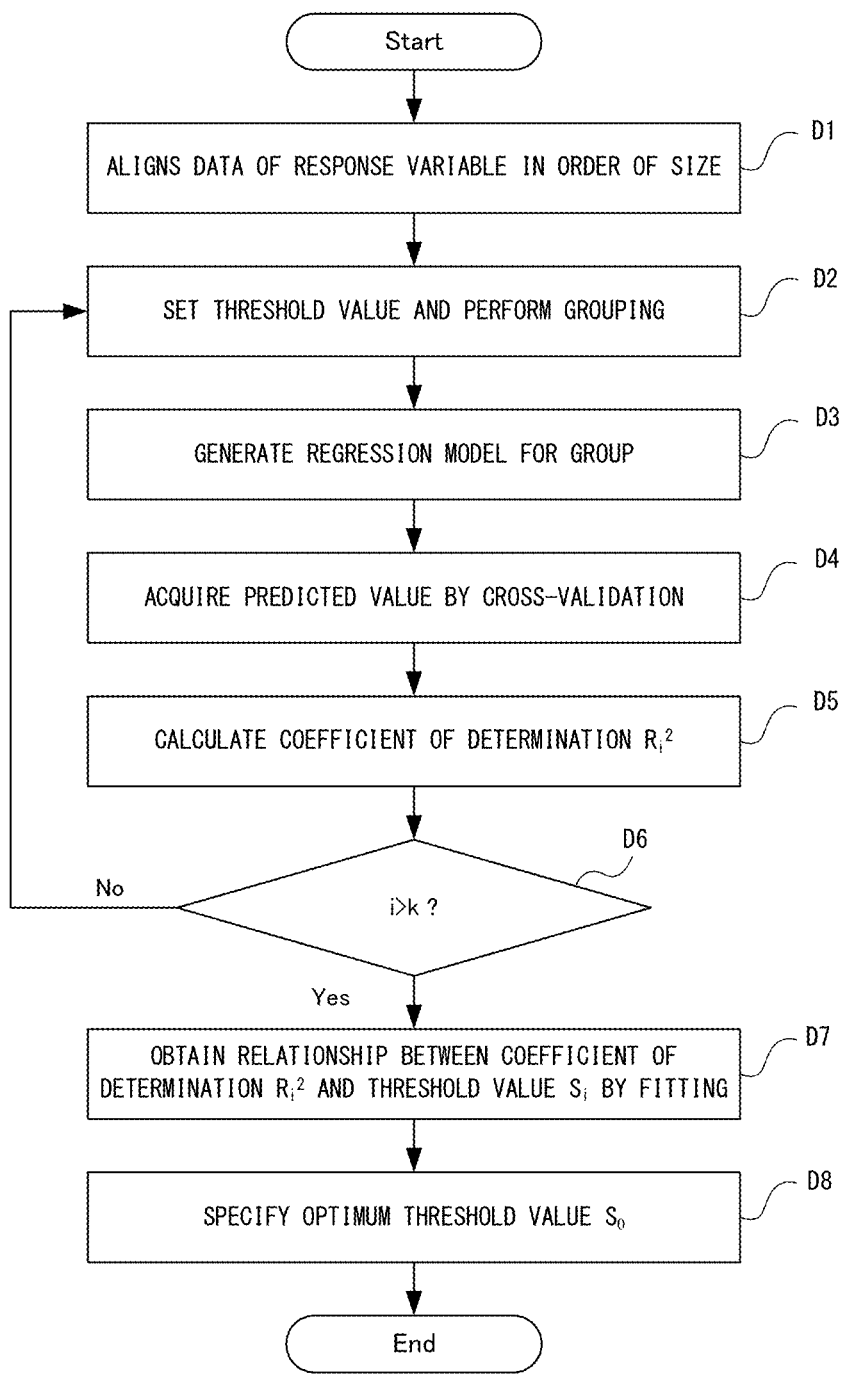
FIG. 10 is a flow diagram illustrating a threshold setting operation of the data analysis apparatus according to the third example embodiment.

Here, the operation of the data analysis apparatus according to the third example embodiment will be described with reference to FIGS. 10 and 11. FIG. 10 is a flow diagram illustrating a threshold setting operation of the data analysis apparatus according to the third example embodiment.

First, the align unit 11 acquires the geoscientific data and the satellite data in a specific region as the sample data from the database 30. Then, the align unit 11 aligns the geoscientific data in the order of the size of the geoscientific data as the response variable, and further aligns the satellite data in the order of the corresponding geoscientific data (step D1). Step D1 is the same step as step A1 shown in FIG. 4.

After the execution of step D1, in the third example embodiment, the classification model generation unit 12 and the regression model generation unit 13 recursively execute the processing as shown below. Then, in this recursive process, grouping of different patterns is performed while changing the threshold value S, which is a grouping reference, regardless of the distribution feature after alignment. For example, when the threshold has k patterns, following flow is recursively executed k times.

Next, after the execution of step D1, the classification model generation unit 12 receives the aligned sample data, sets an arbitrary threshold value Si (i<=k), and groups the aligned sample data aligned in step D1 using the set threshold value Si (step D2).

Then, the regression model generation unit 13 acquires the sample data group grouped in step D2, uses each sample data as the training data, and for each group, learns a correlation between a characteristics indicated by the geoscientific data of the specific region and a characteristics indicated by the satellite data, thereby generating the regression model 17 (step D3).

Next, the data estimation unit 14 performs cross-validation, applies some satellite data of the sample data to the regression model 17 of each group, and acquires the predicted value of the geoscientific data for each group (step D4).

Next, the regression model generation unit 13 summarizes the predicted values for each group obtained in step D4, obtains a correspondence relationship between each of the summarized predicted values and a true value of the sample data prepared in advance, and calculates the coefficient of determination $R_i^2$ based on the obtained correspondence relationship (step D5).

Next, the classification model generation unit 12 determines whether or not a value i of the threshold values S already set is larger than k. (step D6).

As a result of the determination in, step D6, if the value i of the threshold values S already set is not larger than k, the classification model generation unit 12 executes step D2 again.

On the other hand, as a result of the determination in step C6, if the value i of the threshold values S already set is larger than k, the recursive processing ends. The classification model generation unit 12 obtains a relationship between each coefficient of determination $R_i^2$ calculated in step D5 and each threshold value $S_i$ set in step D2 by fitting (step D7).

Figure 11:
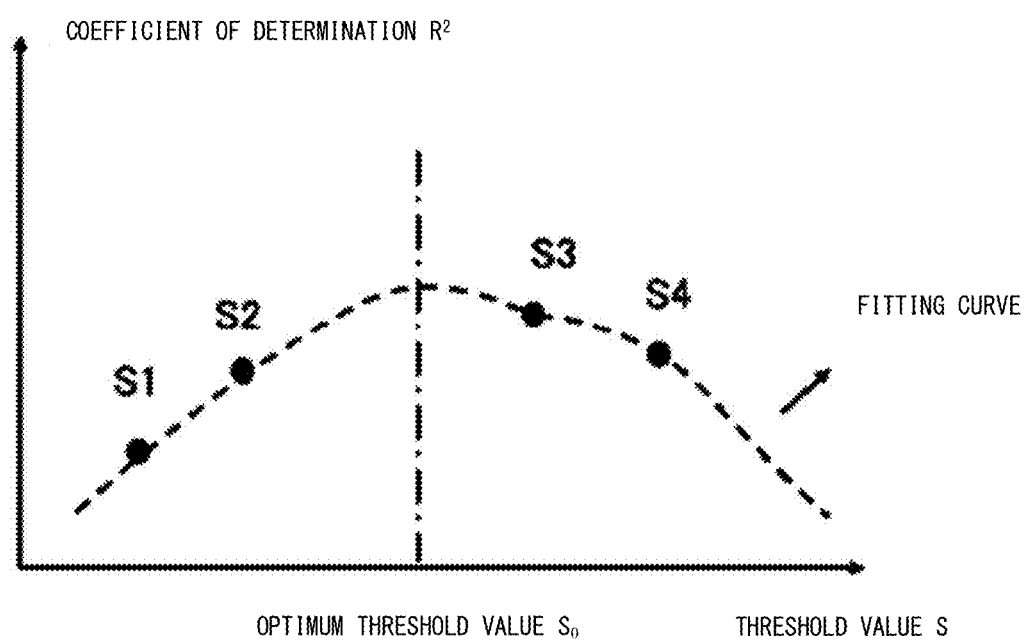
FIG. 11 is a diagram illustrating an example of a fitting of a coefficient of determination and a threshold value performed in the third example embodiment.

Next, as shown in FIG. 11, the classification model generation unit 12 detects a division point at which the coefficient of determination $R_i^2$ becomes the maximum value from a curve obtained by fitting, and uses the detected division point as a reference to specify an optimum threshold value $S_0$ (step D8). FIG. 11 is a diagram illustrating an example of the fitting of the coefficient of determination and the threshold value performed in the third example embodiment.

As shown in FIG. 11, in order to specify the optimum threshold value $S_0$, fitting is performed on k points having the coefficient of determination Ri2 on the vertical axis and the threshold value $S_i$ on the horizontal axis, thereby obtaining the curve. At this time, since it is necessary to obtain the maximum value of the coefficient of determination Ri2, the curve needs to be at least a quadratic function, so that k needs to be 3 or more. If the curve can be obtained, the maximum value of the coefficient of determination $R_i^2$ can be obtained, so that the optimum threshold value $S_0$ is also specified.

Further, in the third example embodiment, when steps D1 to D8 shown in FIG. 10 are executed and the threshold value $S_0$ is specified, steps A3 to A7 shown in FIG. 4 and steps B1 to B7 shown in FIG. 5 are executed by the data analysis apparatus.

Effect of Third Example Embodiment

As described above, in the third example embodiment as well, the threshold value for grouping the pair data is automatically set with high accuracy as in the second example embodiment.

Therefore, even in the case of the third example embodiment, the classification model with high accuracy is generated, so that the estimation accuracy can be improved.

Program

It is sufficient that the program according to the third example embodiment be a program that causes a computer to execute steps D1 to D8 illustrated in FIG. 10, steps A3 to A7 illustrated in FIG. 4 and steps B1 to B7 illustrated in FIG. 5. The data analysis apparatus and the data analysis method according to the third example embodiment can be realized by installing this program in the computer and executing this program. In this case, a processor of the computer functions and performs processing as the align unit 11, the classification model generation unit 12, the regression model generation unit 13, the data estimation unit 14, and the display unit 18.

Also, the program according to the third example embodiment may be executed by a computer system constructed by a plurality of computers. In this case, for example, each computer may function as one of the align unit 11, the classification model generation unit 12, the regression model generation unit 13, the data estimation unit 14, and the display unit 18.

(Physical Configuration)

Figure 12:
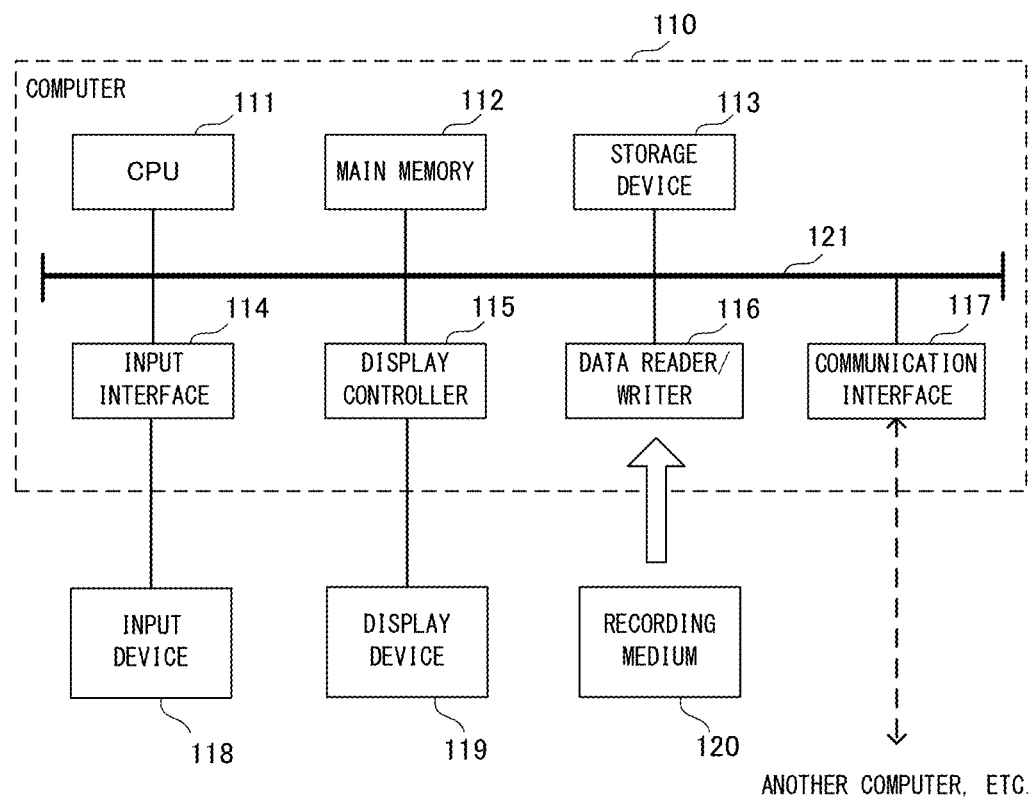
FIG. 12 is a block diagram illustrating an example of a computer that realizes the data analysis apparatus according to the first to third example embodiments.

Using FIG. 12, a description is now given of the physical configuration of a computer that realizes the data analysis apparatus by executing the program according to the first to third example embodiments. FIG. 12 is a block diagram illustrating an example of a computer that realizes the data analysis apparatus according to the first to third example embodiments.

As illustrated in FIG. 12, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111 or in place of the CPU 111.

The CPU 111 carries out various types of computation by deploying the program (codes) according to the example embodiment stored in the storage device 113 to the main memory 112, and executing the deployed program in a predetermined order. The main memory 112 is typically a volatile storage device, such as a DRAM (Dynamic Random Access Memory). Also, the program according to the present example embodiment is provided in a state where it is stored in a computer readable recording medium 120. Note that the program according to the present example embodiment may also be distributed over the Internet connected via the communication interface 117.

Furthermore, specific examples of the storage device 113 include a hard disk drive, and also a semiconductor storage device, such as a flash memory. The input interface 114 mediates data transmission between the CPU 111 and an input device 118, such as a keyboard and a mouse. The display controller 115 is connected to a display device 119, and controls displays on the display device 119.

The data reader/writer 116 mediates data transmission between the CPU 111 and the recording medium 120, and executes readout of the program from the recording medium 120, as well as writing of the result of processing in the computer 110 to the recording medium 120. The communication interface 117 mediates data transmission between the CPU 111 and another computer.

Also, specific examples of the recording medium 120 include: a general-purpose semiconductor storage device, such as CF (Compact Flash®) and SD (Secure Digital); a magnetic recording medium, such as Flexible Disk; and an optical recording medium, such as CD-ROM (Compact Disk Read Only Memory).

Note that the data analysis apparatus according to the first to third example embodiments can also be realized by using items of hardware corresponding to respective components, rather than by using the computer with the program installed therein. Furthermore, a part of the data analysis apparatus may be realized by the program, and the remaining part of the data analysis apparatus may be realized by hardware.

Specific Example

Figure 14A:
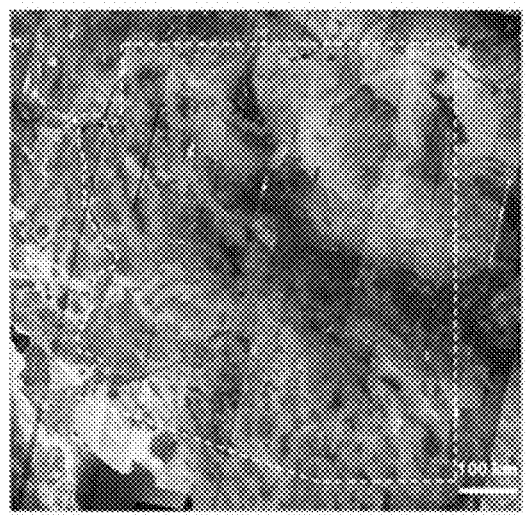
FIG. 14A illustrates a distribution of light reflectance in infrared region.
Figure 14B:
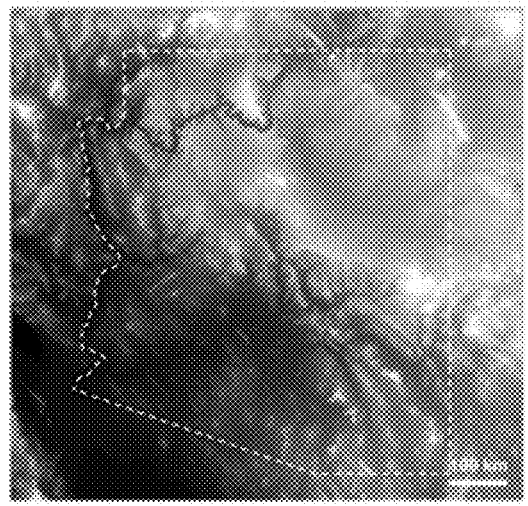
FIG. 14B illustrates an altitude data.
Figure 14C:
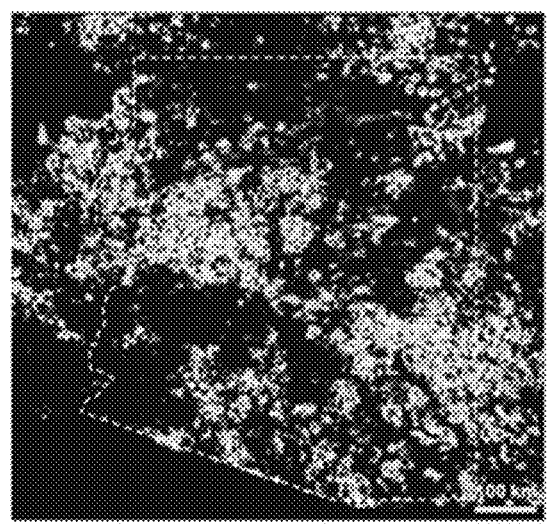
FIG. 14C illustrates a geomagnetic measurement data.

Subsequently, examples of the data analysis apparatus according to the first to third example embodiments will be described with reference to FIGS. 13 to 17. FIG. 13 is a diagram illustrating a sample data at a specific point used in a specific example. FIG. 14 is a diagram illustrating an example of a satellite data used in the specific examples. FIG. 14A illustrates a distribution of light reflectance in infrared region, FIG. 14B illustrates an altitude data, and FIG. 14C illustrates a geomagnetic measurement data.

Figure 16:
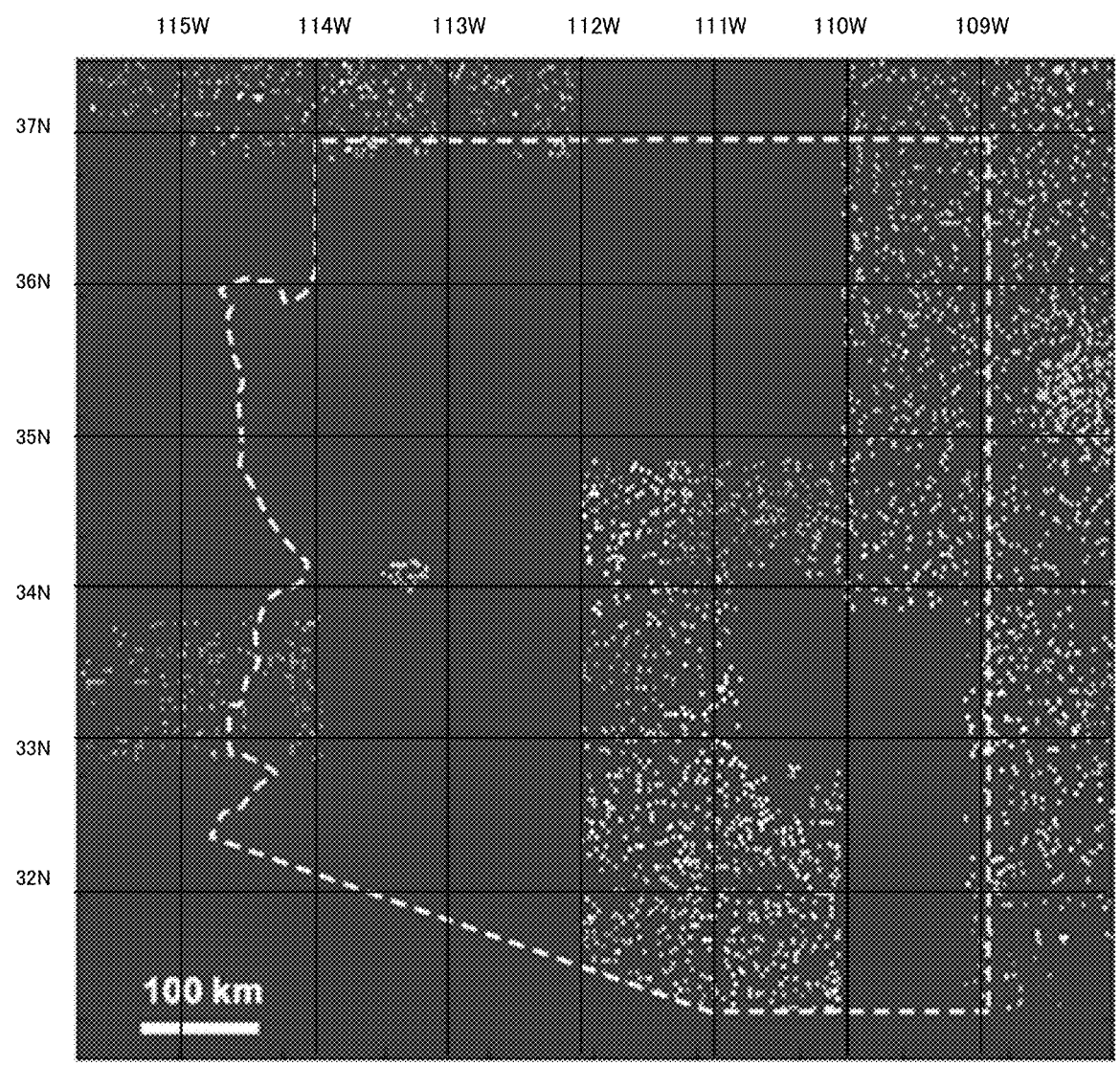
FIG. 16 is a diagram illustrating an example of a specific region from which geoscientific data is acquired and a region other than the specific region.

FIG. 15 is a diagram illustrating an example of a data group of sample data used in the specific example. FIG. 16 is a diagram illustrating an example of a specific region from which geoscientific data is acquired and a region other than the specific region. FIG. 17 is a diagram illustrating a relationship between a predicted value and a true value, FIG. 17A illustrates a case where a conventional method is used and FIG. 17B illustrates a case where the specific example is used.

First, as shown in FIG. 15, in this specific example, the database 30 registers a plurality of the sample data. Then, as shown in FIG. 13, the sample data includes a point (latitude and longitude), the corresponding geoscientific data, and the corresponding satellite data. In the example of FIG. 13, the geoscientific data includes the copper content (ppm) per unit area. The satellite data includes the reflectance of light of a specific wavelength (Aster band data Band 1, Aster band data Band 14, Aster band inverse data Band 1^−1), elevation value, and slope value. Further, as shown in FIGS. 14A to 14C, the satellite data has been acquired in a wide range.

Furthermore, as shown in FIG. 16, some of the plurality of sample data registered in the database 30 lack the geoscientific data (copper content). That is, as shown in FIG. 16, even on the specific region, there is a point where the geoscientific data has not been acquired. In other words, the copper content is acquired as the geoscientific data at the points with white spots, but the copper content is not acquired at the points without white spots. Therefore, the data estimation unit 14 estimates the value of the geoscientific data in the sample data of the specific region in which the geoscientific data is missing by using the classification model 16 and the regression model 17.

Figure 17A:
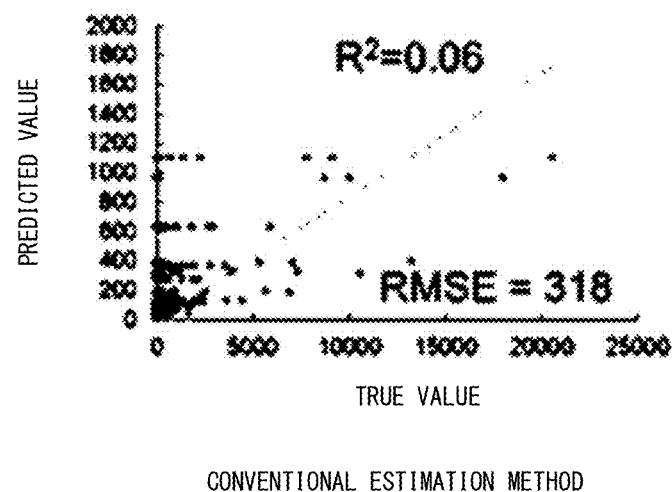
FIG. 17A illustrates a case where a conventional method is used and FIG. 17B illustrates a case where the specific example is used.
Figure 17B:
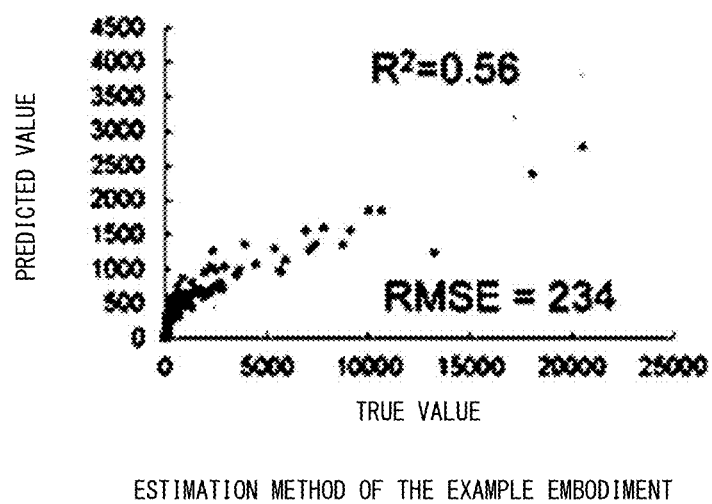

The result of estimation by the data estimation unit 14 is as shown in FIG. 17A. As shown in FIG. 17A, the coefficient of determination $R^2$ is only 0.06 when the estimation method of the conventional method (see Patent Document 2) is used. On the other hand, if the method of the example embodiment is used, the coefficient of determination $R^2$ increases to 0.56.

That is, the regression model generated by the conventional estimation method can effectively explain only 6% of data, but the regression model generated by the estimation method of the example embodiment can effectively explain 56% of data.

Further, in FIGS. 17A and 17B, a root mean squared error (RMSE) is used as an index in order to explain a deviation between the estimated value and the true value. As shown in FIG. 17A, the RMSE is 318 in the estimation result using the regression model generated by the conventional estimation method. On the other hand, as shown in FIG. 17B, in the estimation method of the example embodiment, RMSE has dropped to 234. That is, by using the estimation method of the example embodiment, it is possible to estimate the geoscientific data of another region with high accuracy by using the geoscientific data acquired in a certain region.

A part or all of the aforementioned example embodiment can be described as, but is not limited to, the following (Supplementary note 1) to (Supplementary note 21).

(Supplementary Note 1)

A data analysis apparatus comprising:

an align unit configured to acquire a pair data of a first data indicating a characteristic of a specific region and a second data corresponding to the first data and indicating another characteristic of the specific region, and align the first data in order of their sizes, a classification model generation unit configured to perform grouping a data set of the pair data based on a characteristic of an order distribution of the first data after alignment, classify the data set of the pair data into a plurality of groups, and generate a classification model for classifying the pair data using the classification result, a regression model generation unit configured to perform machine learning for each group, using the first data constituting the pair data as a response variable and the second data constituting the same pair data as an explanatory variable, and generate a regression model indicating a relation with the first data and the second data.

(Supplementary Note 2)

The data analysis apparatus according to Supplementary note 1, further comprising:

a data estimation unit configured to apply the second data in a region other than the specific region to the classification model and the regression model to estimate the first data in the region other than the specific region.

(Supplementary Note 3)

The data analysis apparatus according to Supplementary note 1 or 2, wherein the classification model generation unit executes linear regression on a part of the first data based on the order distribution of the first data after alignment, thereby calculates an approximate straight line, further, sets a threshold value for the grouping using the calculated approximate straight line and performs the grouping using the set threshold value.

(Supplementary Note 4)

The data analysis apparatus according to Supplementary note 3, wherein the classification model generation unit sets a plurality of the threshold values, performs the grouping for each of the plurality of threshold values, thereby generates the classification model, causes the regression model creating unit to generate the regression model for each of the groups obtained by the grouping for each of the plurality of threshold values, continue, further causes the data estimation unit to apply a sample data of the second data to the classification model and the regression model for each of the plurality of thresholds, and to estimate the first data in the region other than the specific region, and then, obtains an evaluation index for evaluating the performance of the regression model from the estimation result of the first data for each of the plurality of threshold values, and determines an optimum value of the threshold value by using the evaluation index for each of the plurality of threshold values.

(Supplementary Note 5)

The data analysis apparatus according to Supplementary note 2, further comprising:

a display unit configured to display the first data in the specific region and the estimated first data in the region other than the specific region overlappingly on the screen.

(Supplementary Note 6)

The data analysis apparatus according to any one of Supplementary notes 1 to 5, wherein the align unit acquires geoscientific data indicating a characteristic of the specific region as the first data, and satellite data indicating another characteristic of the specific region as the second data.

(Supplementary Note 7)

The data analysis apparatus according to Supplementary note 6, wherein the geoscientific data is data indicating existence of specific material in the specific region, the satellite data is data indicating a distribution of a reflectance of a specific wavelength in the specific region.

(Supplementary Note 8)

A data analysis method comprising:

(a) a step of acquiring a pair data of a first data indicating a characteristic of a specific region and a second data corresponding to the first data and indicating another characteristic of the specific region, and aligning the first data in order of their sizes, (b) a step of performing grouping a data set of the pair data based on a characteristic of an order distribution of the first data after alignment, classifying the data set of the pair data into a plurality of groups, and generating a classification model for classifying the pair data using the classification result, (c) a step of performing machine learning for each group, using the first data constituting the pair data as a response variable and the second data constituting the same pair data as an explanatory variable, and generating a regression model indicating a relation with the first data and the second data.

(Supplementary Note 9)

The data analysis method according to Supplementary note 8, further comprising:

(d) a step of applying the second data in a region other than the specific region to the classification model and the regression model to estimate the first data in the region other than the specific region.

(Supplementary Note 10)

The data analysis method according to Supplementary note 8 or 9, wherein in the step (b), executing linear regression on a part of the first data based on the order distribution of the first data after alignment, thereby calculating an approximate straight line, further, setting a threshold value for the grouping using the calculated approximate straight line and performing the grouping using the set threshold value.

(Supplementary Note 11)

The data analysis method according to Supplementary note 10, wherein in the step (b), setting a plurality of the threshold values, performing the grouping for each of the plurality of threshold values, thereby generating the classification model, generating the regression model for each of the groups obtained by the grouping for each of the plurality of threshold values, continue, further applying a sample data of the second data to the classification model and the regression model for each of the plurality of thresholds, and estimating the first data in the region other than the specific region, and then, obtaining an evaluation index for evaluating the performance of the regression model from the estimation result of the first data for each of the plurality of threshold values, and determining an optimum value of the threshold value by using the evaluation index for each of the plurality of threshold values.

(Supplementary Note 12)

The data analysis method according to Supplementary note 9, further comprising:
(e) a step of displaying the first data in the specific region and the estimated first data in the region other than the specific region overlappingly on the screen.

(Supplementary Note 13)

The data analysis method according to any one of Supplementary notes 8 to 12, wherein
in the step (a), acquiring geoscientific data indicating a characteristic of the specific region as the first data, and satellite data indicating another characteristic of the specific region as the second data.

(Supplementary Note 14)

The data analysis method according to Supplementary note 13, wherein
the geoscientific data is data indicating existence of specific material in the specific region,
the satellite data is data indicating a distribution of a reflectance of a specific wavelength in the specific region.

(Supplementary Note 15)

A computer readable recording medium that includes a program recorded thereon, the program including instructions that cause a computer to carry out:
(a) acquiring a pair data of a first data indicating a characteristic of a specific region and a second data corresponding to the first data and indicating another characteristic of the specific region, and aligning the first data in order of their sizes,
(b) performing grouping a data set of the pair data based on a characteristic of an order distribution of the first data after alignment, classifying the data set of the pair data into a plurality of groups, and generating a classification model for classifying the pair data using the classification result,
(c) performing machine learning for each group, using the first data constituting the pair data as a response variable and the second data constituting the same pair data as an explanatory variable, and generating a regression model indicating a relation with the first data and the second data.

(Supplementary Note 16)

The computer readable recording medium according to Supplementary note 15, wherein
the program further includes instructions causing the computer to carry out
(d) a step of applying the second data in a region other than the specific region to the classification model and the regression model to estimate the first data in the region other than the specific region.

(Supplementary Note 17)

The computer readable recording medium according to Supplementary note 15 or 16, wherein
in the step (b), executing linear regression on a part of the first data based on the order distribution of the first data after alignment, thereby calculating an approximate straight line, further, setting a threshold value for the grouping using the calculated approximate straight line and performing the grouping using the set threshold value.

(Supplementary Note 18)

The computer readable recording medium according to Supplementary note 17, wherein
in the step (b),
setting a plurality of the threshold values, performing the grouping for each of the plurality of threshold values, thereby generating the classification model,
generating the regression model for each of the groups obtained by the grouping for each of the plurality of threshold values, continue, further
applying a sample data of the second data to the classification model and the regression model for each of the plurality of thresholds, and estimating the first data in the region other than the specific region, and then,
obtaining an evaluation index for evaluating the performance of the regression model from the estimation result of the first data for each of the plurality of threshold values, and
determining an optimum value of the threshold value by using the evaluation index for each of the plurality of threshold values.

(Supplementary Note 19)

The computer readable recording medium according to Supplementary note 16, wherein
the program further includes instructions causing the computer to carry out
(e) a step of displaying the first data in the specific region and the estimated first data in the region other than the specific region overlappingly on the screen.

(Supplementary Note 20)

The computer readable recording medium according to any one of Supplementary notes 15 to 19, wherein
in the step (a), acquiring geoscientific data indicating a characteristic of the specific region as the first data, and satellite data indicating another characteristic of the specific region as the second data.

(Supplementary Note 21)

The computer readable recording medium according to Supplementary note 13, wherein
the geoscientific data is data indicating existence of specific material in the specific region,
the satellite data is data indicating a distribution of a reflectance of a specific wavelength in the specific region.

The invention has been described with reference to an example embodiment above, but the invention is not limited to the above-described example embodiment. Within the scope of the invention, various changes that could be understood by a person skilled in the art could be applied to the configurations and details of the invention.

INDUSTRIAL APPLICABILITY

As described above, according to the present invention, it is possible to estimate the geoscientific data of another region by using the geoscientific data acquired in one region. The present invention is useful for, for example, mining of mineral resources, ground investigation, vegetation investigation, evaluation of agricultural land, evaluation of growth of agricultural products, prediction of natural disasters, and the like.

REFERENCE SIGNS LIST 10 data analysis apparatus
11 align unit
12 classification model generation unit
13 regression model generation unit
14 data estimation unit
15 storage unit 16 classification model
17 regression model
18 display unit
30 database
110 computer
111 CPU
112 main memory
113 storage device
114 input interface
115 display controller
116 data reader/writer
117 communication interface
118 input apparatus
119 display apparatus
120 recording medium
121 bus

What is claimed is:

1. A data analysis apparatus comprising:
at least one memory storing instructions; and
at least one processor configured to execute the instructions to:
acquire a pair data of a first data indicating a characteristic of a specific region and a second data corresponding to the first data and indicating another characteristic of the specific region, and aligns the first data in order of their sizes,
perform grouping a data set of the pair data based on a characteristic of an order distribution of the first data after alignment, classify the data set of the pair data into a plurality of groups, and generate a classification model for classifying the pair data using the classification result,
perform machine learning for each group, using the first data constituting the pair data as a response variable and the second data constituting the same pair data as an explanatory variable, and generate a regression model indicating a relation with the first data and the second data.

2. The data analysis apparatus according to claim 1,
further at least one processor configured to execute the instructions to:
apply the second data in a region other than the specific region to the classification model and the regression model to estimate the first data in the region other than the specific region.

3. The data analysis apparatus according to claim 2,
further at least one processor configured to execute the instructions to:
display the first data in the specific region and the estimated first data in the region other than the specific region overlappingly on the screen.

4. The data analysis apparatus according to claim 1,
further at least one processor configured to execute the instructions to:
execute regression on a part of the first data based on the order distribution of the first data after alignment, thereby calculates an approximate straight line, further, sets a threshold value for the grouping using the calculated approximate straight line and performs the grouping using the set threshold value.

5. The data analysis apparatus according to claim 4,
further at least one processor configured to execute the instructions to:
set a plurality of the threshold values, performs the grouping for each of the plurality of threshold values, thereby generates the classification model,
causes the regression model creating means to generate the regression model for each of the groups obtained by the grouping for each of the plurality of threshold values, continue, further
causes the data estimation means to apply a sample data of the second data to the classification model and the regression model for each of the plurality of thresholds, and to estimate the first data in the region other than the specific region, and then,
obtains an evaluation index for evaluating the performance of the regression model from the estimation result of the first data for each of the plurality of threshold values, and
determines an optimum value of the threshold value by using the evaluation index for each of the plurality of threshold values.

6. The data analysis apparatus according to claim 1,
further at least one processor configured to execute the instructions to:
acquire geoscientific data indicating a characteristic of the specific region as the first data, and satellite data indicating another characteristic of the specific region as the second data.

7. The data analysis apparatus according to claim 6, wherein
the geoscientific data is data indicating existence of specific material in the specific region,
the satellite data is data indicating a distribution of a reflectance of a specific wavelength in the specific region.

8. A data analysis method comprising:
acquiring a pair data of a first data indicating a characteristic of a specific region and a second data corresponding to the first data and indicating another characteristic of the specific region, and aligning the first data in order of their sizes,
performing grouping a data set of the pair data based on a characteristic of an order distribution of the first data after alignment, classifying the data set of the pair data into a plurality of groups, and generating a classification model for classifying the pair data using the classification result,
performing machine learning for each group, using the first data constituting the pair data as a response variable and the second data constituting the same pair data as an explanatory variable, and generating a regression model indicating a relation with the first data and the second data.

9. The data analysis method according to claim 8, further comprising:
applying the second data in a region other than the specific region to the classification model and the regression model to estimate the first data in the region other than the specific region.

10. The data analysis method according to claim 9, further comprising:
displaying the first data in the specific region and the estimated first data in the region other than the specific region overlappingly on the screen.

11. The data analysis method according to claim 8, wherein
in the performing grouping, executing linear regression on a part of the first data based on the order distribution of the first data after alignment, thereby calculating an approximate straight line, further, setting a threshold value for the grouping using the calculated approximate straight line and performing the grouping using the set threshold value.

12. The data analysis method according to claim 11, wherein in the performing grouping, setting a plurality of the threshold values, performing the grouping for each of the plurality of threshold values, thereby generating the classification model, generating the regression model for each of the groups obtained by the grouping for each of the plurality of threshold values, continue, further applying a sample data of the second data to the classification model and the regression model for each of the plurality of thresholds, and estimating the first data in the region other than the specific region, and then, obtaining an evaluation index for evaluating the performance of the regression model from the estimation result of the first data for each of the plurality of threshold values, and determining an optimum value of the threshold value by using the evaluation index for each of the plurality of threshold values.

13. The data analysis method according to claim 8, wherein in the acquiring the pair data, acquiring geoscientific data indicating a characteristic of the specific region as the first data, and satellite data indicating another characteristic of the specific region as the second data.

14. The data analysis method according to claim 13, wherein the geoscientific data is data indicating existence of specific material in the specific region, the satellite data is data indicating a distribution of a reflectance of a specific wavelength in the specific region.

15. A non-transitory computer readable recording medium that includes a program recorded thereon, the program including instructions that cause a computer to carry out:

acquiring a pair data of a first data indicating a characteristic of a specific region and a second data corresponding to the first data and indicating another characteristic of the specific region, and aligning the first data in order of their sizes, performing grouping a data set of the pair data based on a characteristic of an order distribution of the first data after alignment, classifying the data set of the pair data into a plurality of groups, and generating a classification model for classifying the pair data using the classification result, performing machine learning for each group, using the first data constituting the pair data as a response variable and the second data constituting the same pair data as an explanatory variable, and generating a regression model indicating a relation with the first data and the second data.

16. The non-transitory computer readable recording medium according to claim 9, wherein the program further includes instructions causing the computer to carry out applying the second data in a region other than the specific region to the classification model and the regression model to estimate the first data in the region other than the specific region.

17. The non-transitory computer readable recording medium according to claim 16, wherein the program further includes instructions causing the computer to carry out displaying the first data in the specific region and the estimated first data in the region other than the specific region overlappingly on the screen.

18. The non-transitory computer readable recording medium according to claim 9, wherein in the performing grouping, executing linear regression on a part of the first data based on the order distribution of the first data after alignment, thereby calculating an approximate straight line, further, setting a threshold value for the grouping using the calculated approximate straight line and performing the grouping using the set threshold value.

19. The non-transitory computer readable recording medium according to claim 17, wherein in the performing grouping, setting a plurality of the threshold values, performing the grouping for each of the plurality of threshold values, thereby generating the classification model, generating the regression model for each of the groups obtained by the grouping for each of the plurality of threshold values, continue, further applying a sample data of the second data to the classification model and the regression model for each of the plurality of thresholds, and estimating the first data in the region other than the specific region, and then, obtaining an evaluation index for evaluating the performance of the regression model from the estimation result of the first data for each of the plurality of threshold values, and determining an optimum value of the threshold value by using the evaluation index for each of the plurality of threshold values.

20. The non-transitory computer readable recording medium according to claim 9, wherein in the acquiring the pair data, acquiring geoscientific data indicating a characteristic of the specific region as the first data, and satellite data indicating another characteristic of the specific region as the second data.

* * * * *